United States Patent [19]

Dougherty et al.

[11] Patent Number: 4,775,604
[45] Date of Patent: Oct. 4, 1988

[54] METHOD AND APPARATUS FOR SEALING A BATTERY TERMINAL POST

[75] Inventors: Thomas J. Dougherty, Waukesha; Richard A. Hamann, Milwaukee; Matthias Geibl, Germantown, all of Wis.

[73] Assignee: Globe-Union Inc., Milwaukee, Wis.

[21] Appl. No.: 80,154

[22] Filed: Jul. 29, 1987

Related U.S. Application Data

[63] Continuation of Ser. No. 860,997, May 8, 1986, abandoned.

[51] Int. Cl.$^4$ .................. H01M 2/02; H01M 2/08
[52] U.S. Cl. ............................ 429/178; 429/183; 429/184
[58] Field of Search ............... 429/178, 181–184

[56] References Cited

U.S. PATENT DOCUMENTS

| | | | |
|---|---|---|---|
| 1,386,946 | 8/1921 | Norris | 429/183 |
| 1,460,895 | 7/1923 | Doughty et al. | 429/184 X |
| 1,590,479 | 6/1926 | Miller | 429/183 |
| 1,600,442 | 9/1926 | Willard | 429/181 X |
| 1,642,550 | 9/1927 | Mackenzie | 429/183 |
| 1,716,197 | 6/1929 | Swenson | 429/183 |
| 4,522,899 | 6/1985 | Illman et al. | 429/181 |
| 4,588,663 | 5/1986 | Mason et al. | 429/54 |

Primary Examiner—Brian E. Hearn
Assistant Examiner—Stephen J. Kalafut
Attorney, Agent, or Firm—E. Levine; Alexander M. Gerasimow; Joseph J. Jochman, Jr.

[57] ABSTRACT

The interface between the plastic cover of a battery container and the lead or other metal terminal post which extends therethrough is sealed with a rubber bushing which is compressed and extruded along the terminal post during installation and locked tightly in its compressed and extruded state. The bushing preferably has a pair of oppositely angled intersecting frustoconical surfaces on its exterior surface which are adapted to cooperate with mating surfaces surrounding the opening in the cover and on a locking retainer. The assembly provides a flexible seal which will accommodate the inevitable vertical movement of the terminal post as a result of battery element expansion. Most importantly, the assembly provides an extremely effective barrier to the migration of electrolyte along the terminal post to prevent outer terminal corrosion. The rubber bushing is preferably impregnated with silicone oil which, when the bushing is installed, fills the surface voids in the cast terminal post which otherwise provide paths for electrolyte migration. The silicone oil also provides a lubricant for the controlled compression and extrusion of the bushing.

7 Claims, 2 Drawing Sheets

METHOD AND APPARATUS FOR SEALING A BATTERY TERMINAL POST

This application is a continuation of application Ser. No. 860,997 filed May 8, 1986, now abandoned.

BACKGROUND OF THE INVENTION

The present invention relates to a method for sealing the terminal post of a storage battery and a post seal assembly for use therein. The invention is particularly adaptable to sealing the interface between a lead terminal post and the terminal opening in a plastic cover for a lead-acid battery.

It is well known in the art of secondary lead-acid batteries that one of the most difficult and vexatious problems is the construction and maintenance of a liquid-tight seal between the battery terminal post and the container cover through which the post extends from the interior of the battery. One of the typical seals in common use today comprises a lead bushing which is insert-molded into the container cover and into and through which the cylindrical lead terminal post extends as the cover is placed on and sealed to the container. The interface betwenn the ID of the lead bushing and the OD of the terminal post is subsequently heat-fused to provide an integral structure and tight fluid seal.

However, as is well-known in the art, the terminal post, which is integrally attached at its lower end to battery cell elements in the interior of the container, is subjected to a substantial axial force as a result of the expansion of the plates comprising the elements during cycling of the battery. Because of the rigid attachment of the terminal post to the lead bushing and, in turn, the lead bushing to the container cover, the axial force on the terminal post often results in failure of one of the rigid interfaces or cracking of the cover itself. In either event, the insidious migration of acid electrolyte along surface imperfections in the various components of the seal is obviously worsened in the event of failure of the sealing surfaces or cracking of the cover. The migrating acid electrolyte will eventually find its way past the seal and result in the condition known as "post-leakage" which leads to corrosive damage of the terminal connection and increased electrical resistance.

In recognition of the foregoing problems, many attempts have been made to provide a fluid-tight seal between the terminal post and battery cover which allows vertical movement of the post. In a general sense, these prior art seals all employ a flexible rubber or plastic sealing member between the terminal post and the lead bushing or between the bushing and an integral plastic sleeve molded as part of the cover and defining the terminal post opening therein. Attempts have also been made to seal directly the interface between the terminal post and the cover by molding, pressing, or otherwis inserting a flexible sealing material therebetween.

One prior art seal assembly, disclosed in U.S. Pat. No. 4,522,899, comprises a composite annular plastic ring which is molded in two steps around the terminal post. The first molded component of the composite is a soft thermoplastic rubber which is subsequently enclosed by molding a harder thermoplastic material, such as polypropylene, around it and the terminal post. Shrinkage of the second molded thermoplastic material around the softer first material compresses the latter to enhance the seal with the terminal post and between the two plastics forming the composite. The container cover is placed over the terminal post which extends therethrough and the underside of the cover is welded to the upper surface of the seal assembly as the cover is heat-sealed or ultrasonically welded to the battery container. The effectiveness of the foregoing seal assembly relies solely on the compression provided by the injection molding process and subsequent shrinkage of the outer harder thermoplastic component during hardening and cooling.

U.S. Pat. No. 4,410,610 discloses a seal assembly in which the lead bushing is encased in a rubber sealing material along its entire outer diameter, lower end and most of its inner diameter. The seal is inserted around a terminal post extending through the cover and inserted in a cup-shaped depression in the cover surrounding the post. The exposed upper portion of the ID of the lead bushing is subsequently welded or burned to the terminal post such that the composite lead and rubber bushing is rigidly fixed to the terminal post. Vertical movement of the terminal post is accommodated by movement of the rubber OD portion of the seal within the cup-like depression in the cover. Although this seal assembly appears to provide an effective barrier against acid migration directly along the terminal post, the flexible and movable interface between the assembly and the cover, because it is not a highly compressed seal, would appear to provide a ready alternate path for acid migration to the outside of the cover.

U.S. Pat. No. 4,495,260 describes a terminal post seal assembly somewhat like that disclosed in U.S. Pat. No. 4,410,610 above. A lead bushing is molded into a larger diameter plastic bushing and the composite assembly is inserted over the terminal post and into a cup-like depression in the container cover. The lead bushing is fused to the terminal post and the interface between the outer plastic bushing and the cylindrical surface of the cup-like depression in the cover is constructed for vertical movement and sealed with an O-ring or rings. A terminal post seal utilizing O-rings as the primary sealing elements is also disclosed in U.S. Pat. No. 4,164,609. In this construction, however, O-rings provide the seal between both the terminal post and the surrounding bushing-like retainer assembly and between the retainer assembly and the portion of the cover housing the assembly. O-rings are known to distort and provide non-uniform sealing when compressed. In addition, O-rings have an inherently small sealing surface area which is generally considered to be unsatisfactory for the difficult sealing problem presented by the terminal post of a lead-acid battery.

Thus, whether utilizing constructions in which the terminal post is rigidly fixed to the cover or where a seal assembly is used which permits relative movement between the post and the cover, acid migration and its resultant adverse effects remain problems. The prior art dynamic seals which permit vertical movement of the terminal post do so at a substantial sacrifice in sealing capability. A dynamic seal of this type, to be effective, is believed to require a significant level of compression against the surfaces to be sealed which compression must be controlled and maintained during the operational life oi the battery. It is also desirable that the seal assembly be of relatively simple construction and easy to install.

SUMMARY OF THE INVENTION

The present invention is directed to a terminal post seal assembly and method for providing a terminal post seal which overcome all of the problems attendant prior art sealing means. It has been found that by uniquely configuring the outer surface of a compressible rubber bushing and encapsulating it against the terminal post between similarly configured surfaces in the container cover and a separate retainer, the bushing may be compressed tightly between the encapsulating elements and extruded along the terminal post. The controlled radial compression and axial extrusion of the bushing provides a uniform liquid-tight seal with a substantial sealing surface which prevents acid migration and is tolerant to vertical post movement.

In the preferred embodiment of the seal assembly, the opening in the container cover, adapted to receive the terminal post, includes an integral sleeve which tapers downwardly toward the terminal post and defines a space therearound which is adapted to receive the compressible elastomer bushing inserted around the terminal post and into the space. The bushing has one frustoconical outer surface corresponding to the tapered surface on the sleeve and another oppositely angled frustoconical surface corresponding to and engaged by the lower surface of an annular retainer inserted around the terminal and over the bushing. Either the lower end of the sleeve or the upper portion of the retainer is spaced radially from the terminal post such that the bushing, in its installed position, is completely encapsulated except for one axial end. Axial insertion of the retainer into the sleeve and against the bushing causes radial compression of the bushing against the terminal post and the tapered surfaces of the sleeve and retainer and simultaneously causes axial extrusion of the bushing along the terminal post in the direction of its free unencapsulated end. The retainer includes means to secure it to the sleeve and maintain the bushing in its compressed and extruded state.

The elastomer bushing is preferably impregnated with a silicone oil which lubricates the contacting surfaces of the assembly to assure uniform compression and extrusion of the bushing, fills surface imperfections on the sealed surfaces to prevent the entry of the acid electrolyte, and assists in accommodating relative movement between the terminal post and the highly compressed bushing.

In addition to the integral sleeve in the cover and the terminal post, the seal assembly comprises only two parts, i.e. the bushing and the retainer. Installation of the assembly, in either of its two embodiments, is simple and is readily adaptable to automated assembly techniques.

DESCRIPTION OF THE PREFERRED EMBODIMENTS

Figure 1:
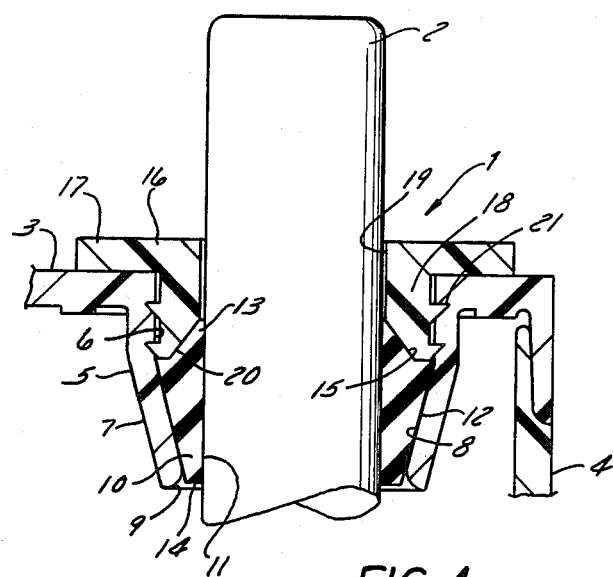
FIG. 1 is a vertical section through the seal assembly of the preferred embodiment.

Referring to FIG. 1, the seal assembly 1 of the preferred embodiment is adapted to provide a fluid-tight seal between the cylindrical terminal post 2 and the cover 3 of a storage battery container 4 only one portion of a side wall of which is shown. In accordance with conventional construction, the terminal post 2 is attached at its lower and to a battery cell element and is inserted therewith into the container 4 in a preliminary assembly step. The cover 3 is subsequently placed over and heat-sealed or otherwise attached to the container. The terminal post 2, which must accommodate an external terminal connection, extends through an integral sleeve 5 in the cover 3. The container and cover are typically molded from a thermoplastic material, such as polypropylene. In the case of a lead-acid battery, the terminal post 2 is cast from lead or a lead alloy.

Figure 2:
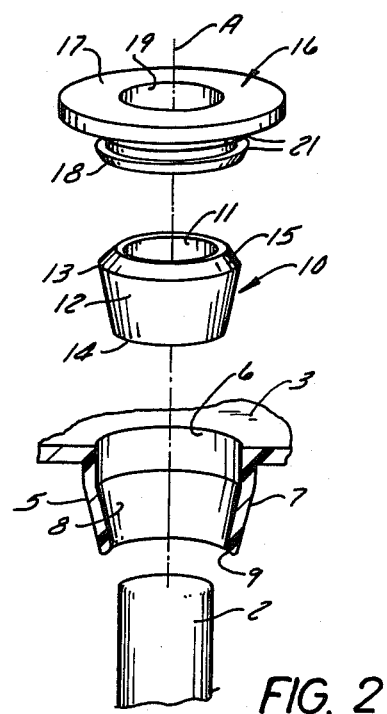
FIG. 2 is an exploded perspective view, in slightly reduced scale, showing the components of the FIG. 1 seal assembly in their relative positions prior to assembly.

Referring also to FIG. 2, the sleeve 5 depends downwardly from the underside of the cover and defines an upwardly opening annular space around the terminal post. The upper portion of the sleeve defines a cylindrical interior surface 6 which intersects the upper surface of the cover. The lower portion 7 of the sleeve tapers radially inwardly toward the terminal post defining an interior first frustoconical bearing surface 8. The lower end 9 of the tapered portion 7 is spaced radially from the terminal post 2.

A compressible elastomer bushing 10 has a cylindrical interior surface 11 approximately equal to the diameter of the terminal post and is adapted to be inserted around the post and into the annular space between the post and the sleeve 5. The bushing includes a first frustoconical exterior surface 12 which, in axial cross-section, defines a base end 13 and a narrower lip end 14. As shown, the first frustoconical exterior surface 12 of the bushing comprises a major portion of the axial length thereof. The base end 13 of the bushing 10 preferably includes a second frustoconical exterior surface 15 which is oppositely angled with respect to the first frustoconical surface 12 and is disposed at a greater angle with respect to the axis A of the bushing and the assembly than the first frustoconical surface. In the specific embodiment shown, the angles between the first and second frustoconical exterior surfaces 12 and 15 and the axis A are, respectively, 16° and 43°.

An annular retainer 16 includes a wide, flat upper rim portion 17 and an integral downwardly depending flange portion 18. The open interior of the retainer 16 includes a cylindrical surface portion 19 having a diameter slightly larger than the diameter of the terminal post 2. The lower end of the flange portion 18 of the retainer 16 is provided with a second frustoconical bearing surface 20 which is adapted to contact the second frustoconical exterior surface 15 of the base end 13 of the bushing as the seal is assembled. The radially outer surface of the retainer flange 18 is provided with a number of annular sharp-edged ribs 21 to secure the retainer 16 to the sleeve 5, as will be described in more detail hereinafter.

The interface between the terminal post 2 and the cover 3 is sealed by assembling the various components from the relative order shown in FIG. 2 to the assembled configuration shown in FIG. 1. As previously indicated, with the battery element (not shown) including the upwardly extending terminal post 2 inserted in the container 4, the cover is placed over and sealed to the container with the terminal post protruding through the sleeve 5. The bushing 10 is placed around the post and inserted into the annular space, followed by insertion of the retainer 16. As the second frustoconical bearing surface 20 on the flange portion 18 of the retainer comes in contact with the second frustoconical exterior surface 15 of the bushing 10, all but the lip end 14 of the bushing is encapsulated by the other components of the assembly. Thus, the first frustoconical bearing surface 8 on the sleeve and the second frustoconical bearing surface 20 on the retainer 16 lie coextensive with and bear upon, respectively, the first and second frustoconical exterior surfaces 12 and 15 of the bushing. In addition, the cylindrical interior surface 11 of the bushing bears along its entire length against the terminal post 2. As the retainer 16 is pressed into final position, with the underside of the rim portion 17 bearing against the cover 3, the radial and axial components of the bearing forces imposed by the bearing surfaces 8 and 20 on the bushing surfaces 12 and 15 result, respectively and simultaneously, in a substantial compression and extrusion of the bushing. Although, as would be expected, the axial extrusion of the bushing would inherently be in the direction of its unencapsulated lip end 14, the relative difference in angles of the bearing surfaces provides a resultant axial force in the direction the bushing is extruded. The dimensional changes in radial thickness and axial length of the elastomer bushing from its free unassembled state to its compressed and extruded state when finally assembled were found to be directly proportional. Thus, a compressive reduction of about 12% in thickness is accompanied by about a 12% axial elongation.

The retainer 16 of the embodiment shown in FIGS. 1 and 2 is preferably made of a much harder plastic than the polypropylene cover 3. One suitable material is carbonate filled ABS (acrylonitrile-butadiene-styrene copolymer). The harder retainer material allows the integral ribs 21 to bite into and be securely retained in the softer polypropylene material of the sleeve 5 in the manner of a staked insert. The retainer may also be installed by ultrasonic welding or heat sealing methods.

The elastomer bushing may be made of any suitable compressible material which is resistant to attack by the acid electrolyte in a lead-acid battery or correspondingly inert to electrolytes used in other battery systems. Natural rubber or any of many synthetic elastomers are suitable and the latter include, for example, ethylene-propylene-diene monomer, ethylene terpolymer, vinylidene fluoride-hexafluoropropylene copolymer and butyl-N. The elastomer material preferably has a Shore A durometer rating in the range of 35 to 80, but ratings outside that range in either direction may also be suitable. Installation of the bushing, its sealing properties and the accommodation of vertical post movement are all significantly enhanced by impregnating bushing material with silicone oil. The silicone oil acts as a lubricant to facilitate the controlled compression and extrusion of the bushing during assembly, as well as decreasing the resistance to terminal post movement. Equally importantly, however, the silicone oil permeates and iills minute surface irregularities in the lead terminal post and other abutting components and helps to preclude the entry of migrating acid electrolyte.

Figures 3, 4:
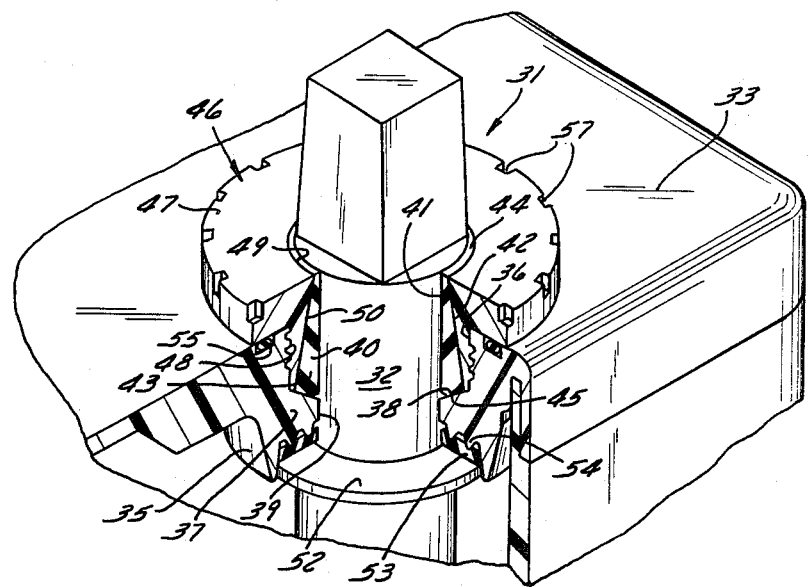
FIG. 3 is a perspective view, partly in section, showing an alternate embodiment of the seal assembly.
FIG. 4 is a perspective view, similar to FIG. 2, showing the components of the seal assembly of FIG. 3.

An alternate embodiment of the seal assembly of the present invention is shown in FIGS. 3 and 4. This assembly has been found to be particularly well-adapted for use in large stationary lead-acid cells or batteries which may have lead terminal posts one and one-half inches in diameter. However, the seal assembly is adaptable as well to smaller batteries for which the assembly in FIGS. 1 and 2 is particularly useful. The seal assembly of this alternate embodiment is constructed, installed and operates in essentially the same manner as the assembly of the first preferred embodiment. In general, the basic differences include inversion and extrusion of the bushing in the opposite axial direction, corresponding changes in the angles and orientation of the frustoconical bearing surfaces on the cover sleeve and retainer, a threaded rather than staked retainer, and supplemental sealing means.

Referring now to the drawing, the assembly 31 is adapted to seal the interface between the cylindrical terminal post 32 and the battery cover 33 after the latter is placed over and secured to the container 34. The cover 33 includes a downwardly depending sleeve 35 which has a threaded upper interior surface 36 and an inwardly tapered lower end 37 which, because of the inverted installation of the bushing 40 (as compared to bushing 10 of the first embodiment) defines a second interior frustoconical bearing surface 38. Bearing surface 38 tapers downwardly and radially inwardly to terminate in a short lower cylindrical interior surface 39 closely adjacent and slightly spaced from the terminal post 32.

The bushing 40 may be identical in shape and composition to the bushing 10 of the first embodiment, with obvious relative differences in size to accommodate the size of the terminal post being the only difference. Thus, the bushing 40 includes a cylindrical interior surface 41, a first frustoconical exterior surface 42 extending the major portion of its axial length and defining, in axial cross-section, a base end 43 and a narrower lip end 44. The base end 43 of the bushing includes a second frustoconical exterior surface 45 angled and oriented with respect to the first frustoconical surface 42 as the corresponding similar surfaces of bushing 10. As previously mentioned, bushing 40 is adapted to be inserted around the terminal post 32 and into the annular space between the post and the sleeve 35 with its base end 43 oriented downwardly and in contact with the second frustoconical bearing surface 38.

An annual retainer 46 includes an upper rim portion 47 and a downwardly depending flange portion 48. The radially outer surface of the flange portion 48 is provided with threads corresponding to and adapted to engage the threaded interior surface 36 of the sleeve 35. The interior surface of the retainer 46 tapers downwardly and radially outwardly along its entire axial length to define the first frustoconical bearing surface 50 adapted to engage and bear upon the first frustoconical exterior surface 42 of the bushing during assembly of the seal. The first frustoconical bearing surface 50 extends all the way to the upper surface of the retainer 46 to define a circular opening 49 which is spaced substantially from the terminal post 32.

The sealing assembly 31 also includes supplementary lower and upper sealing means. The supplemental lower seal is utilized to protect the main seal assembly 31 from direct acid spray caused primarily by the bubbling of gases generated during formation. Thus, the lower portion of terminal post 32 is provided with an integral horizontal flange 52 upon which is placed a flexible sealing washer 53 before the battery cover 33 is installed. The underside of the tapered lower portion 37 of the sleeve 35 is provided with a series of concentric circular ribs 54 which press into the sealing washer 53 as the cover is placed over and sealed to the container 34.

The upper supplemental sal is intended to inhibit the ingress of either solid or liquid contamients. It is of simple construction and comprises an O-ring 55 inserted in a circular groove 56 in the cover surrounding the opening to the sleeve 35. The seal is completed and maintained as the retainer 46 is threaded into the sleeve 35 and the underside of the rim portion 47 engages the O-ring 55 and presses it into the circular groove 56. Installation of the retainer 46 may be facilitated by the use of a spanner wrench engaging the circumferentially placed notches 57 in the rim 47.

The controlled compression and extrusion of the elastomer bushing 40 is provided virtually identically to that of the bushing 10 in the preferred embodiment. Because of its inverted orientation, however, the upper lip end 44 of the bushing 40 is extruded upwardly and into the space between the terminal post and the circular opening 49 at the top of the retainer 46. In this embodiment, the optimum angles of the first and second frustoconical exterior surfaces 42 and 45 with respect to the vertical axis A have been found to be 12° and 60°, respectively. However, a wide range in the angles of the frustoconical surfaces on both the bushing and the corresponding bearing surfaces on the sleeve and retainer may be used. Thus, in either embodiment, the range of angles of the first and second frustoconical exterior surfaces extending from 12° to 16° and 43° to 60°, respectively, may be broadened considerably, so long as the controlled compression and extrusion, previously described, is effected. To this end, the second frustoconical exterior surface 15 or 45 of the bushing 10 or 40 may even be eliminated, and the base end simply flattened to lie at an angle of 90° to the axis A. The corresponding bearing surface 20 or 38 would, of course, be similarly flattened.

We claim:

1. A battery terminal seal assembly for sealing the interface between a battery container cover and a cylindrical terminal post extending therethrough from the interior of the container comprising:
    a. an integral sleeve extending downwardly from the underside of the cover, said sleeve having an upwardly opening interior portion defining an annular space around the terminal post and a lower portion extending generally radially inwardly toward and terminating adjacent to the terminal post;
    b. a compressible elastomer bushing having a cylindrical interior surface with a diameter approximately equal to the diameter of the terminal post and first and second frustoconical exterior surfaces oppositely angled and intersecting one another, one of said frustoconical surfaces having an exterior surface which defines in axial cross section a base end and a narrower lip end, said bushing adapted to be inserted around the terminal post within the annular space;
    c. an annular retainer having a downwardly depending flange portion adapted to be inserted downwardly around the terminal, into the annular space and over the bushing;
    d. the flange portion of the retainer bearing against a major portion of an exterior surface of said fist frustoconical surface, the lower portion of the sleeve bearing against a major portion of an exterior surface of said second frustoconical surface and the terminal post providing coextensive encapsulation of all but the lip end of the bushing such that downward insertion of the retainer compresses the bushing radially and causes axial extrusion of the bushing only in the direction of the lip end thereof along the terminal post; and,
    e. means on the retainer and the sleeve for securing the bushing in its compressed and extruded state.

2. The invention as described in claim 1 wherein said second frustonconical surface is disposed at a greater angle to the bushing axis than said first frustoconical surface.

3. The invention as described in claim 1 wherein the lower end of the tapered lower portion of the sleeve is spaced radially from the terminal post and the bushing is inserted with its lip end extending downwardly.

4. The invention as described in claim 1 wherein the upper end of the annual retainer is spaced radially from the terminal post and the bushing is inserted with its lip end extending upwardly.

5. The invention as described in claim 1 wherein the bushing is impregnated with silicone oil.

6. The invention as described in claim 5 wherein the elastomer bushing material is selected from the group consisting of ethylene-propylene-diene monomer, ethylene terpolymer, vinylidene fluoride-hexafluoropropylene copolymer and butyl-N.

7. The inventin as described in claim 6 wherein the bushing material has a Shore A durometer rating in the range of 35 to 80.

* * * * *